United States Patent
Park

(10) Patent No.: US 11,126,285 B2
(45) Date of Patent: Sep. 21, 2021

(54) DISPLAY APPARATUS

(71) Applicant: Samsung Display Co., Ltd., Yongin-si (KR)

(72) Inventor: Changmin Park, Gwangmyeong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/702,193

(22) Filed: Dec. 3, 2019

(65) Prior Publication Data

US 2020/0103990 A1    Apr. 2, 2020

Related U.S. Application Data

(63) Continuation of application No. 15/847,568, filed on Dec. 19, 2017, now Pat. No. 10,540,026.

(30) Foreign Application Priority Data

Apr. 24, 2017  (KR) .................. 10-2017-0052490

(51) Int. Cl.
*G06F 3/041* (2006.01)
*H05K 5/00* (2006.01)
*G06F 1/16* (2006.01)

(52) U.S. Cl.
CPC ............ *G06F 3/041* (2013.01); *G06F 1/1643* (2013.01); *G06F 1/1652* (2013.01); *G06F 1/1681* (2013.01); *H05K 5/0017* (2013.01); *G06F 2203/04102* (2013.01)

(58) Field of Classification Search
CPC . H01L 51/525; H01L 51/5253; G06F 1/1698; G06F 1/16542; G06F 1/1681
See application file for complete search history.

(56) References Cited

U.S. PATENT DOCUMENTS

| | | | |
|---|---|---|---|
| 9,176,535 B2 | 11/2015 | Bohn et al. | |
| 9,562,380 B2 | 2/2017 | Song | |
| 9,603,271 B2* | 3/2017 | Lee | H04M 1/0268 |
| 9,625,947 B2* | 4/2017 | Lee | G06F 1/1616 |
| 9,786,207 B2 | 10/2017 | Kim et al. | |

(Continued)

FOREIGN PATENT DOCUMENTS

| | | |
|---|---|---|
| CN | 104900153 A | 9/2015 |
| CN | 105605084 A | 5/2016 |

(Continued)

*Primary Examiner* — William Lu
(74) *Attorney, Agent, or Firm* — Lewis Roca Rothgerber Christie LLP

(57) ABSTRACT

A display apparatus includes: a display module configured to display an image and to be folded about a folding axis at a folding area defined on a plane; a support member below the display module; and a protective member between the display module and the support member. The support member includes a folding part overlapping the folding area and configured to be folded about the folding axis, and the folding part includes a plurality of joint portions extending parallel to the folding axis and connected to each other. Each of the joint portions includes a support surface supporting the display module, and when the support member is folded, a cusp point is formed between adjacent ones of the support surfaces on a cross-section.

17 Claims, 17 Drawing Sheets

(56) References Cited

U.S. PATENT DOCUMENTS

| | | | |
|---|---|---|---|
| 9,911,793 B2 | 3/2018 | Lee et al. | |
| 10,091,896 B2* | 10/2018 | Chu | G06F 1/1652 |
| 10,114,424 B2* | 10/2018 | Campbell | E05D 3/06 |
| 10,151,424 B2* | 12/2018 | Hong | G06F 1/1601 |
| 10,310,566 B2* | 6/2019 | Liao | G06F 1/1652 |
| 2012/0307423 A1* | 12/2012 | Bohn | G06F 1/1652 |
| | | | 361/679.01 |
| 2015/0131222 A1* | 5/2015 | Kauhaniemi | H05K 5/0226 |
| | | | 361/679.27 |
| 2015/0370287 A1* | 12/2015 | Ko | G06F 1/1681 |
| | | | 361/749 |
| 2016/0070304 A1* | 3/2016 | Shin | G06F 1/1656 |
| | | | 361/679.26 |
| 2016/0118616 A1* | 4/2016 | Hiroki | H01L 51/0097 |
| | | | 257/40 |
| 2016/0139634 A1* | 5/2016 | Cho | G06F 1/1652 |
| | | | 361/679.27 |
| 2017/0025634 A1* | 1/2017 | Jeong | G06F 1/1652 |
| 2017/0061836 A1* | 3/2017 | Kim | G06F 1/1652 |
| 2017/0140679 A1* | 5/2017 | Tomoda | G09G 3/3208 |
| 2018/0098442 A1* | 4/2018 | Han | H05K 5/0217 |
| 2018/0101200 A1* | 4/2018 | Myeong | G06F 1/1652 |
| 2018/0110139 A1* | 4/2018 | Seo | H04M 1/0216 |
| 2018/0307338 A1* | 10/2018 | Park | G06F 1/1652 |
| 2020/0142447 A1* | 5/2020 | Yoon | G06F 1/1643 |

FOREIGN PATENT DOCUMENTS

| | | |
|---|---|---|
| CN | 106486018 A | 3/2017 |
| CN | 106548713 A | 3/2017 |
| KR | 10-2014-0026547 A | 3/2014 |
| KR | 10-1452869 B1 | 10/2014 |
| KR | 10-2017-0012739 A | 2/2017 |

* cited by examiner

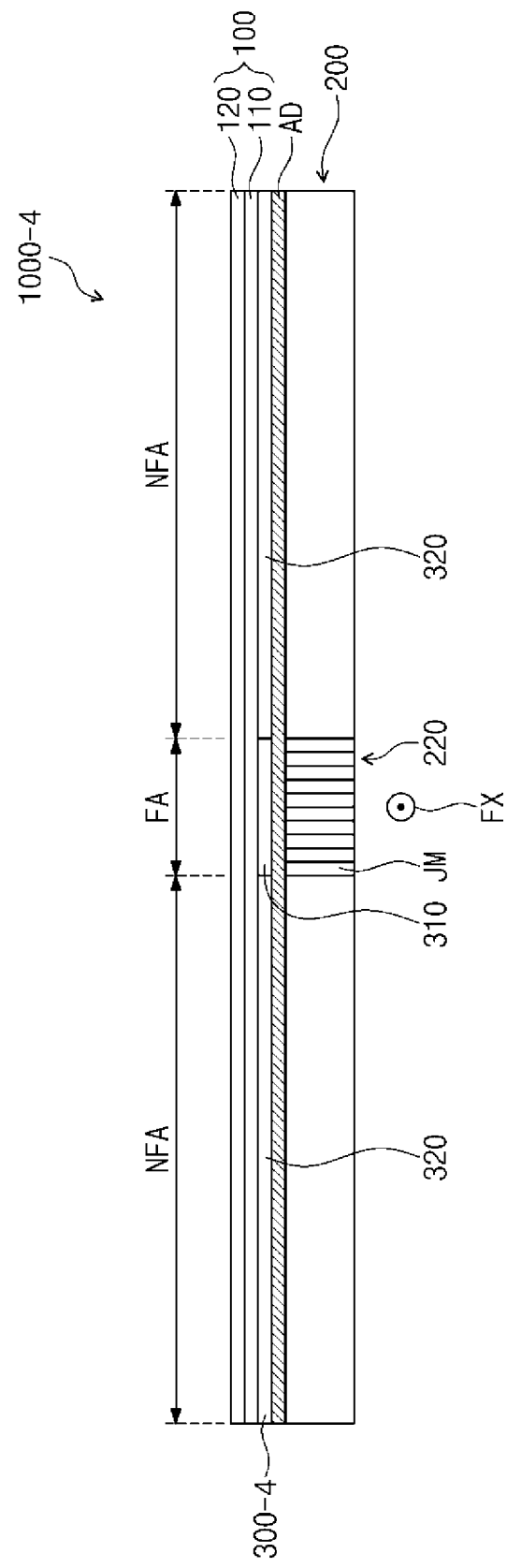

DISPLAY APPARATUS

CROSS-REFERENCE TO RELATED APPLICATIONS

This patent application is a continuation of U.S. patent application Ser. No. 15/847,568, filed Dec. 19, 2017, which claims priority to and the benefit of Korean Patent Application No. 10-2017-0052490, filed on Apr. 24, 2017 in the Korean Intellectual Property Office, the entire content of which is hereby incorporated by reference.

BACKGROUND

1. Field

Aspects of embodiments of the present disclosure relate to a display apparatus.

2. Description of the Related Art

A display apparatus displays various images on a display screen to provide information to a user. Recently, display apparatuses including flexible display members and capable of being folded or rolled are being developed. A flexible display apparatus is designed to be folded, rolled, or bent like paper, unlike a rigid or non-flexible flat display apparatus. The flexible display apparatus capable of varying in shape may be easily carried and enhance users' convenience.

SUMMARY

The present disclosure provides a display apparatus having improved durability.

An embodiment of the inventive concept provides a display apparatus including: a display module configured to display an image and to be folded about a folding axis at a folding area defined on a plane; a support member below the display module; and a protective member between the display module and the support member. The support member includes a folding part overlapping the folding area and configured to be folded about the folding axis. The folding part includes a plurality of joint portions extending parallel to the folding axis and connected to each other, and each of the joint portions include a support surface supporting the display module. When the support member is folded, a cusp point is formed between adjacent ones of the support surfaces on a cross-section.

The support member may further include a support plate connected to the folding part and overlapping a non-folding area of the display module that is adjacent to the folding area on the plane.

The protective member may include: a first portion overlapping the folding area; and a second portion overlapping the non-folding area, and the first portion may include a material different from that of the second portion.

The first portion may have a strength that is less than that of the second portion.

The support plate may have a thickness greater than that of the folding part.

The display apparatus may further include an adhesion member between the support member and the protective member to couple the support member to the protective member.

The protective member may have a strength greater than that of the display module and equal to or less than that of the support member.

The protective member may include metal.

The protective member may include a plastic material.

The folding part may further include a plurality of connection members respectively connecting adjacent ones of the joint portions to each other, and each of the joint portions may be configured to rotate to allow the folding part to be folded.

Each of the joint portions may further include a bottom surface opposite the support surface and nearer to the folding axis than the support surface is.

The support surface may have a surface area greater than that of the bottom surface.

Each of the joint portions may have a reverse trapezoidal cross-sectional shape.

Each of the joint portions may further include a plurality of side surfaces extending between the support surface and the bottom surface, and corners between the support surface and the side surfaces may have a chamfered shape.

Each of the joint portions may have a rectangular cross-sectional shape.

The support surface may include a curved surface.

The protective member may have a surface area equal to that of the folding area.

The display module may include: a display member configured to display the image; and an input detection member on the display member and configured to detect an external input. The input detection member may include a plurality of input detection sensors.

Another embodiment of the inventive concept provides a display apparatus including: a display module configured to display an image and to be folded about a folding axis at a folding area defined on a plane; a support member below the display module; and a protective member between the display module and the support member. The support member includes a folding part overlapping the folding area and configured to be folded about the folding axis, and the folding part includes a plurality of joint portions connected to each other and extending parallel to the folding axis.

An embodiment of the inventive concept provides a display apparatus including: a display module configured to display an image and to be folded about a folding axis at a folding area defined on a plane; a support member below the display module; and a protective member between the display module and the support member. The support member includes a plurality of joint portions extending parallel to the folding axis. Each of the plurality of joint portions includes a support surface supporting the display module, and each of the support surfaces has a flat plate shape.

BRIEF DESCRIPTION OF THE DRAWINGS

The accompanying drawings are included to provide a further understanding of the inventive concept and are incorporated in and constitute a part of this specification. The drawings illustrate exemplary embodiments of the inventive concept and, together with the description, explain aspects and features of the inventive concept. In the drawings:

FIG. 12 is a cross-sectional view of a display apparatus according to another embodiment of the inventive concept.

DETAILED DESCRIPTION

Figure 1:
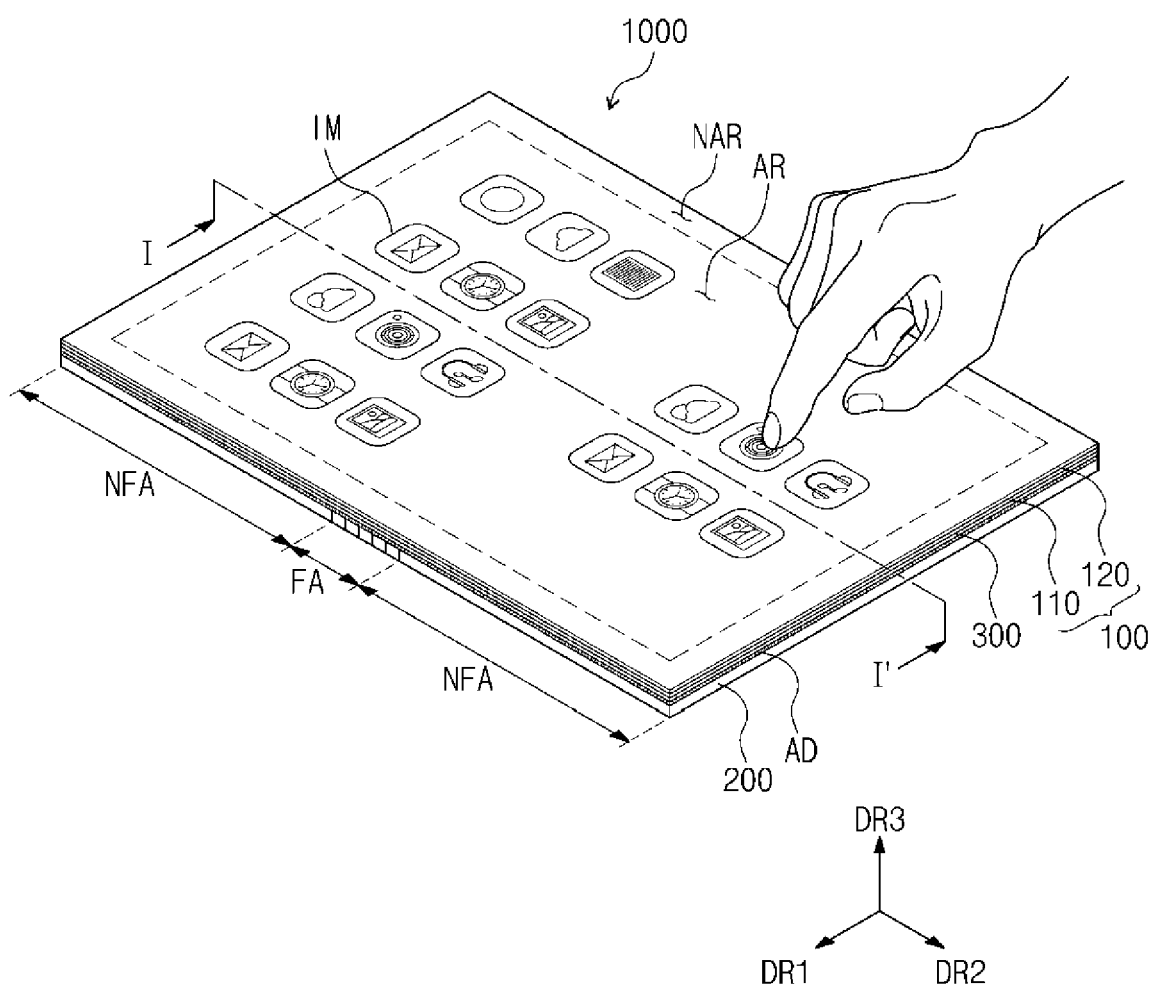
FIG. 1 is a perspective view of a display apparatus according to an embodiment of the inventive concept.

Aspects and features of the inventive concept and implementation methods thereof will be clarified through the following embodiments described with reference to the accompanying drawings. The present disclosure may, however, be embodied in different forms and should not be construed as limited to the embodiments set forth herein. Rather, these embodiments are provided so that this disclosure will be thorough and complete and will fully convey the scope of the inventive concept to those skilled in the art. The present disclosure is to be defined by the scope of claims and their equivalents. Like reference numerals refer to like elements throughout.

It will also be understood that when an element or a layer is referred to as being "on" another element or layer, it can be directly on the other element or layer or intervening elements or layers may also be present. When an element is referred to as being "directly on" another element, there are no intervening elements or layers present. As used herein, the term "and/or" includes any and all combinations of one or more of the associated listed items. Further, the use of "may" when describing embodiments of the present invention relates to "one or more embodiments of the present invention." Also, the term "exemplary" is intended to refer to an example or illustration.

Spatially relative terms, such as "below", "beneath", "lower", "above", "upper" and the like, may be used herein for ease of description to describe one element or feature's relationship to another element(s) or feature(s) as illustrated in the figures. The spatially relative terms should be understood as terms which include different directions of configurative elements in addition to directions illustrated in the figures when using or operating the inventive concept.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, or section discussed below could be termed a second element, component, or section within the technical idea of the present disclosure.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The embodiments in the detailed description will be described with schematic cross-sectional views and/or plan views as ideal exemplary views of the inventive concept. Accordingly, shapes shown in the exemplary views may be modified according to manufacturing techniques and/or allowable errors. Therefore, the embodiments of the inventive concept are not limited to the specific shapes illustrated in the exemplary views and may include other shapes that may be created according to manufacturing processes unless specifically noted otherwise. Areas exemplified in the drawings have general properties and are used to illustrate a specific shape of a semiconductor package region. Thus, this should not be construed as limiting the scope of the inventive concept.

Hereinafter, exemplary embodiments of the inventive concept will be described below in more detail with reference to the accompanying drawings.

Figure 2:
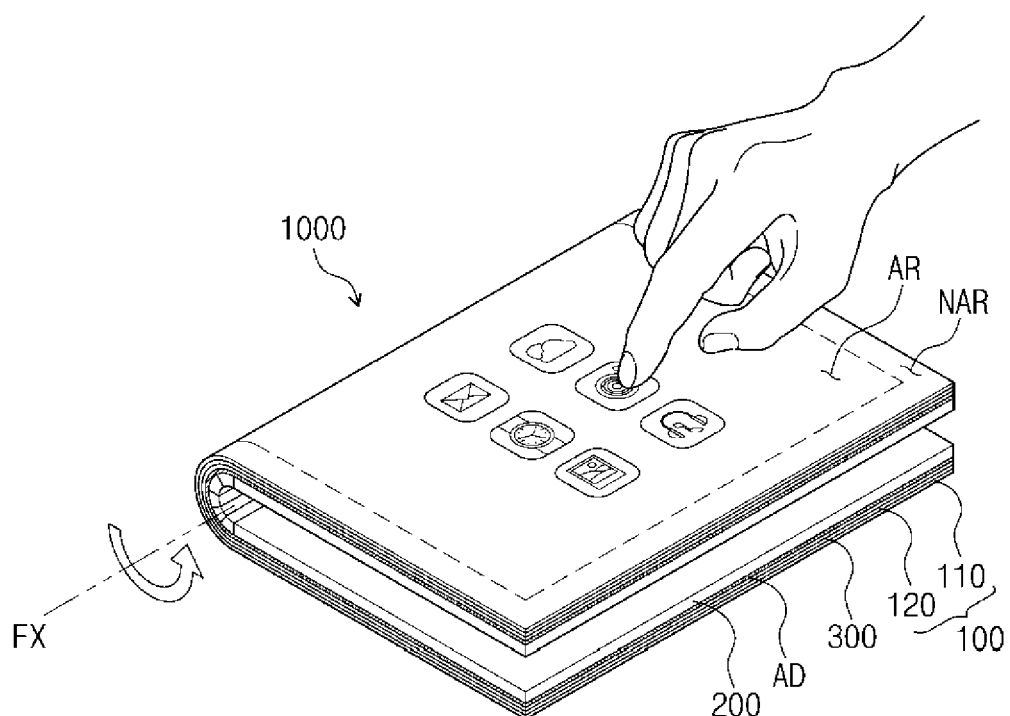
FIG. 2 is a view illustrating the display apparatus shown in FIG. 1 in an outwardly folded state.

FIG. 1 is a perspective view of a display apparatus according to an embodiment of the inventive concept, and FIG. 2 is a view illustrating the display apparatus shown in FIG. 1 in an outwardly folded (or out-folded) state.

Referring to FIGS. 1 and 2, a display apparatus 1000 has a rectangular shape having a short side (a first side) in a first direction DR1 and a long side (a second side) in a second direction DR2 crossing the first direction DR1. However, embodiments of the inventive concept are not limited to this shape of the display apparatus 1000. For example, display apparatuses according to other embodiments of the inventive concept may have various suitable shapes.

The display apparatus 1000 may be a flexible display apparatus 1000. For example, the display apparatus 1000 may be folded or unfolded with respect to a folding axis FX (e.g., a folding axis FX extending in a reference direction). The display apparatus 1000 may be a folding-type (foldable) display apparatus 1000. In an embodiment of the inventive concept, the folding axis FX extends in (is parallel to) the first direction DR1.

The display apparatus 1000 may be divided into a plurality of areas based on how the display apparatus 1000 is folded (e.g., according to the folding action or about a folding axis). For example, the display apparatus 1000 may be divided into a folding area FA and one or more non-folding areas NFA, each of which are arranged adjacent each other on a plane. The folding area FA is an area to which a folding stress is applied according to the folding action. In the illustrated embodiment, the folding area FA of the display apparatus 1000 is defined between two non-folding areas NFA, and the folding area FA overlaps the folding axis FX.

The display apparatus 1000 according to another embodiment of the inventive concept may be a rollable display apparatus that may be wound with respect to a rotation axis.

Also, while the display apparatus 1000 in the illustrated embodiment is shown as having one folding area FA, the inventive concept is not limited thereto. According to another embodiment of the inventive concept, the display apparatus 1000 may have a plurality of folding areas.

According to another embodiment of the inventive concept, the display apparatus 1000 may not include the non-folding areas NFA (e.g., the entire display apparatus 1000 may be foldable).

According to embodiments of the inventive concept, various suitable types of display apparatuses having a range of flexibility may be used.

Figure 3:
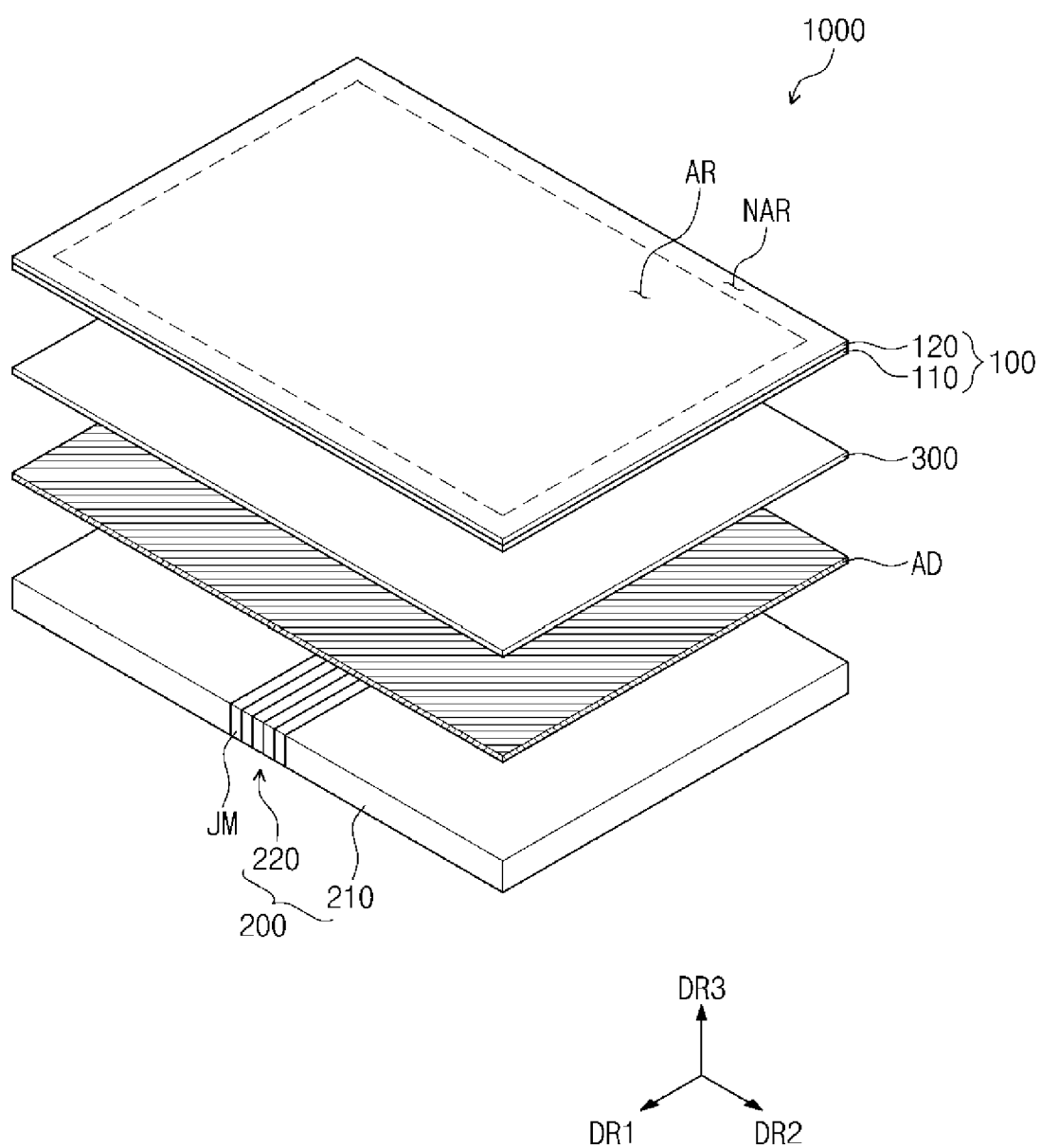
FIG. 3 is an exploded perspective view of the display apparatus shown in FIG. 1.
Figure 4:
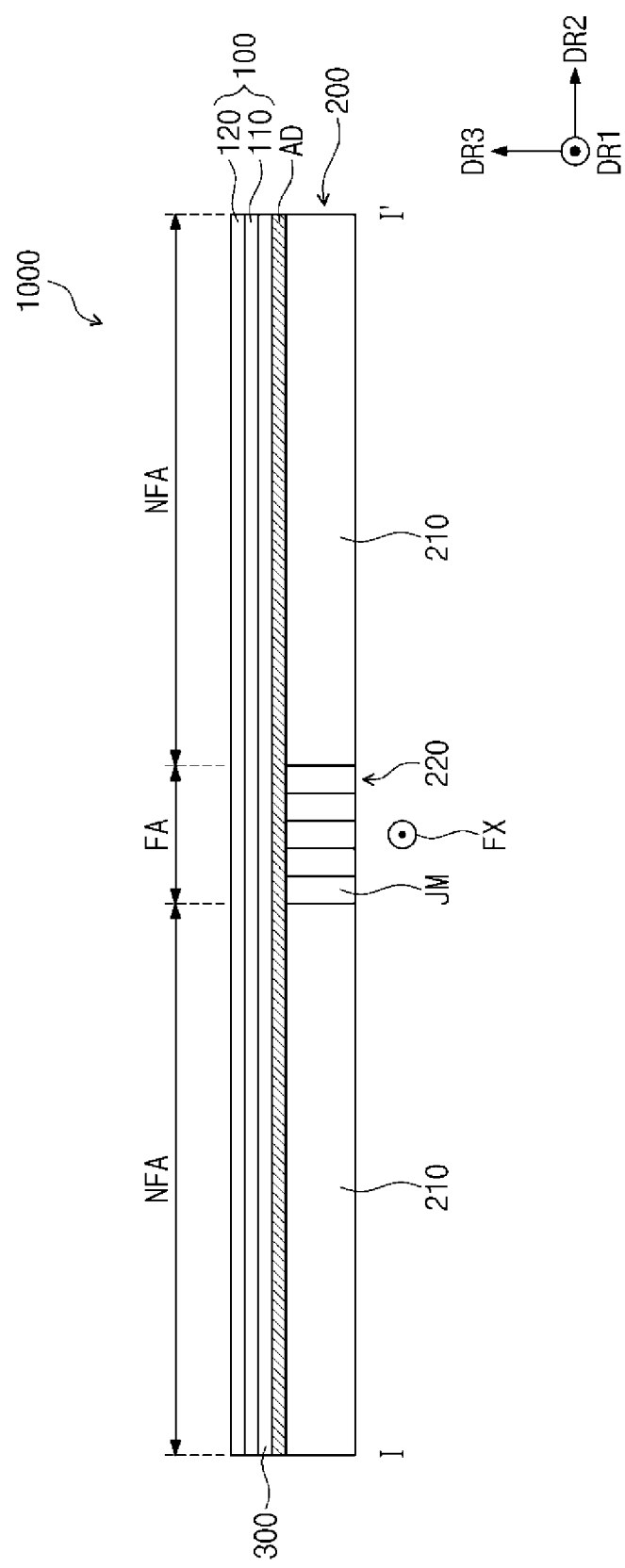
FIG. 4 is a cross-sectional view taken along the line I-I' in FIG. 1.

FIG. 3 is an exploded perspective view of the display apparatus shown in FIG. 1, and FIG. 4 is a cross-sectional view taken along the line I-I' in FIG. 1.

Further referring to FIGS. 3 and 4, the display apparatus 1000 includes a display module 100, a support member 200, and a protective member 300.

The display module 100 may be divided into an active area AR and a peripheral area NAR on a plane defined by the first direction DR1 and the second direction DR2. The active area AR is defined at a central portion of the display module 100. The peripheral area NAR is disposed adjacent to the active area AR. The peripheral area NAR may surround (e.g., may surround a periphery of) the active area AR. In the illustrated embodiment, the peripheral area NAR has a frame shape surrounding (e.g., surrounding a periphery of) the active area AR.

The display module 100 includes a display member 110 and an input detection member 120.

The display member 110 may be a bottom-most layer (e.g., a base or basal layer) on which the input detection member 120 is disposed. For example, the display member 110 may be or may include an insulation substrate or an insulation film. The display member 110 displays an image IM (refer to, for example, FIG. 1) in the active area AR.

As illustrated in FIG. 2, when the display apparatus 1000 is out-folded (outwardly folded) with respect to the folding axis FX, the active area AR is exposed to the outside and the display apparatus 1000 may display the image IM even in a folded state (e.g., the displayed image IM may be visible to a user).

The support member 200 is disposed below the display module 100 (e.g., below the display module 100 in an emission direction) to support the display module 100. The support member 200 may have strength greater than that of the display module 100. For example, the support member 200 may include a metallic material.

The support member 200 includes one or more support plates 210 and a folding part 220. The support plate 210 overlaps the non-folding area NFA of the display module 100. In the illustrated embodiment, the support plates 210 are disposed to respectively overlap, in a one-to-one manner, the non-folding areas NFA.

The folding part 220 overlaps the folding area FA. On a plane, the folding part 220 has a surface area corresponding to that of the folding area FA. The folding part 220 includes a plurality of joint portions JM adjacent each other in the second direction DR2. Each of the joint portions JM has a bar shape extending in the first direction DR1, and each of the joint portions JM is connected to an adjacent joint portion JM in the second direction DR2. A shape of the folding parts 220 will be described below in more detail with reference to FIGS. 7, 8A, and 8B.

The protective member 300 is disposed between the display module 100 and the support member 200. In the illustrated embodiment, the protective member 300 has a sheet shape. When the display apparatus 1000 is folded, the protective member 300 prevents or reduces damage to the display module 100 by the folding part 220 of the support member 200.

The protective member 300 may have a strength greater than that of the display module 100 and equal to or less than that of the support member 200. The protective member 300 may include a material having a relatively high thermal expansion rate. For example, the protective member 300 may include a metallic material, such as an iron-nickel (Fe—Ni) alloy or stainless steel. However, the inventive concept is not limited thereto. According to another embodiment of the inventive concept, the protective member 300 may include a polymer resin. For example, the protective member 300 may be a photopolymer resin or a thermosetting resin. For example, the protective member 300 may include polypropylene (PP), polyethylene terephthalate (PET), polymethyl methacrylate (PMMA), Poly Carbonate (PC), cellulose triacetate (TAC), and/or cyclo-olefin polymer (COP).

The display apparatus 1000 according to an embodiment of the inventive concept may further include an adhesion member AD disposed between the protective member 300 and the support member 200. The adhesion member AD attaches the protective member 300 to the support member 200. According to an embodiment of the inventive concept, the protective member 300 may include a thermosetting resin.

In an embodiment in which the adhesion member AD is omitted, the protective member 300 may be integrated with the folding part 220. For example, the protective member 300 and the joint portions JM of the folding part 220 may be integrated with each other through an injection molding process.

Figure 5:
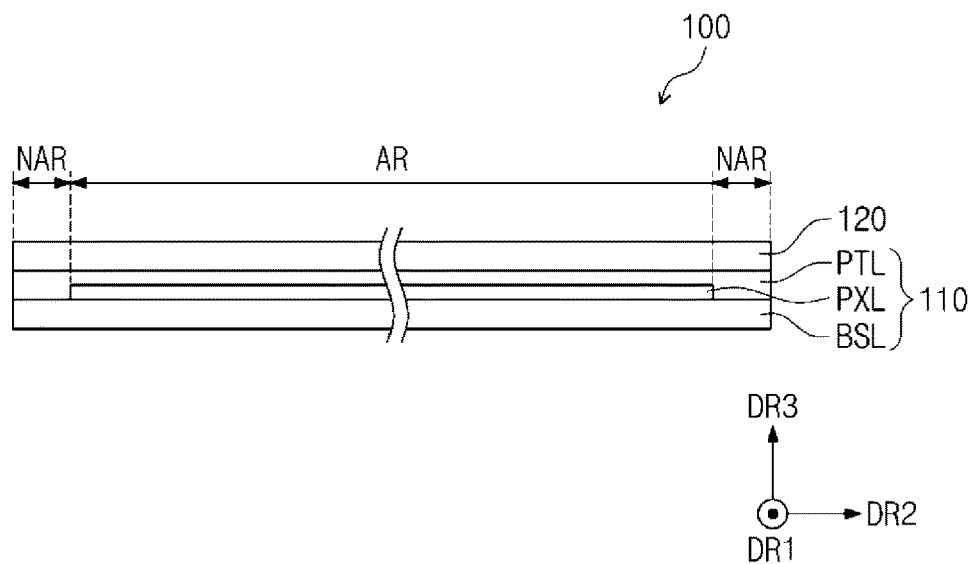
FIG. 5 is an expanded cross-sectional view of the display module shown in FIGS. 1-3.

FIG. 5 is an expanded cross-sectional view of the display module shown in FIGS. 1-3.

Referring to FIG. 5, the display member 110 includes a base layer BSL, a pixel layer PXL, and a protective layer PTL. The base layer BSL defines a rear surface of the display module 100. The base layer BSL may be made of a flexible material.

The pixel layer PXL is disposed on the base layer BSL. The pixel layer PXL includes a plurality of pixels. The pixels receive an electrical signal to realize the image IM.

According to an embodiment of the inventive concept, the kind of the display member 110 may be determined on the basis of the constitution of the pixel layer PXL. The display member 110 may be a liquid crystal display panel, an organic light emitting display panel, an electrophoretic display panel, an electrowetting display panel, or various suitable display panels capable of displaying an image. That is, the display member 110 may include various suitable display elements and is not limited to any one embodiment.

Figure 6:
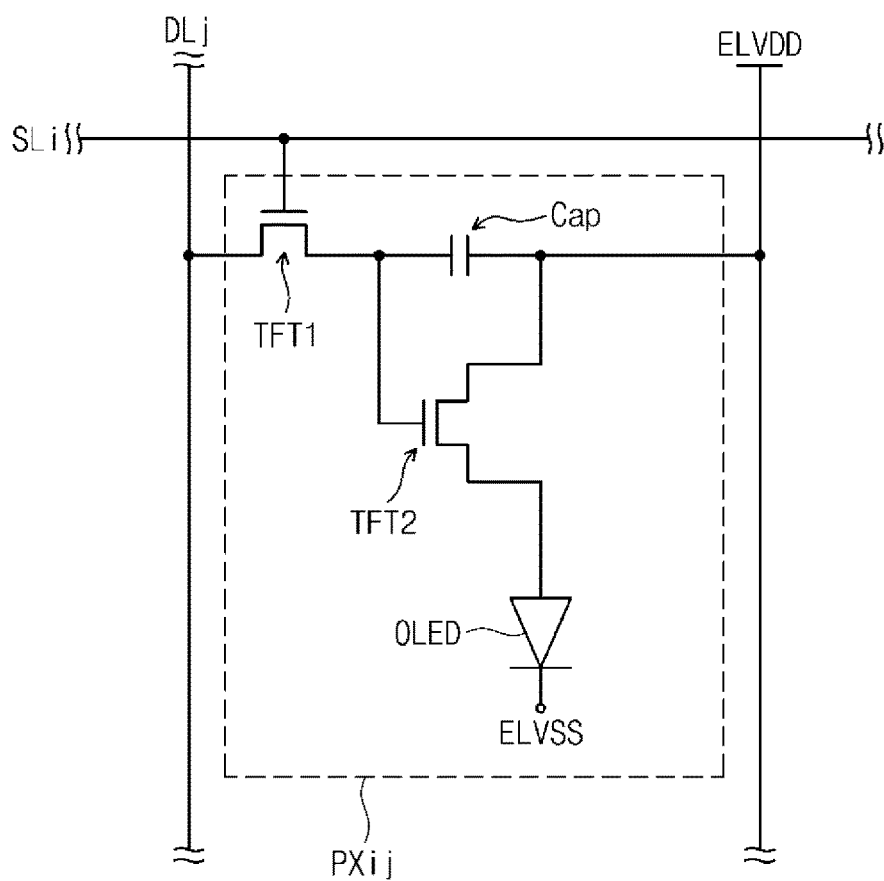
FIG. 6 is an equivalent circuit diagram illustrating one pixel of the display apparatus.

FIG. 6 is an equivalent circuit diagram illustrating one pixel of the display apparatus.

Further referring to FIG. 6, the display member 110 may be an organic light emitting display panel. Accordingly, one pixel PXij includes one or more thin-film transistors, one or more capacitors, and one or more display elements. In the illustrated embodiment, the pixel PXij includes a first thin-film transistor TFT1, a second thin-film transistor TFT2, a capacitor Cap, and an organic light emitting diode OLED.

The first thin-film transistor TFT1 includes a control electrode connected to an i-th scan line SLi, an input electrode connected to a j-th data line DLj, and an output electrode. The first transistor TR1 outputs a data signal applied to the j-th data line DLj in response to a scan signal applied to the i-th scan line SLi.

The capacitor Cap includes a first capacitor electrode connected to the first thin-film transistor TFT1 and a second capacitor for receiving a first power voltage ELVDD. The capacitor Cap charges (stores) a charge corresponding to a difference between the first power voltage ELVDD and a voltage corresponding to a data signal received from the first thin-film transistor TFT1.

The second thin-film transistor TFT2 includes a control electrode connected to the output electrode of the first thin-film transistor TFT1 and the first capacitor electrode of the capacitor Cap, an input electrode for receiving the first power voltage ELVDD, and an output electrode. The output electrode of the second thin-film transistor TFT2 is connected to the organic light emitting diode OLED.

The second thin-film transistor TFT2 controls a driving current flowing in the organic light emitting diode OLED in correspondence with the voltage stored in the capacitor Cap. According to the amount of charge charged in the capacitor Cap, a turn-on time of the second thin-film transistor TFT2 is determined. Generally, the output electrode of the second thin-film transistor TFT2 provides a lower voltage than the first power voltage ELVDD to the organic light emitting diode OLED.

The organic light emitting diode OLED includes a first electrode connected to the second thin-film transistor TFT2 and a second electrode for receiving a second power voltage ELVSS. The organic light emitting diode OLED may include a light emitting pattern disposed between the first and second electrodes.

The organic light emitting diode OLED emits light during a turn-on interval of the second thin-film transistor TFT2. The light emitted from the organic light emitting diode OLED has a color that is determined by a material forming the light emitting pattern. For example, the color of the light emitted from the organic light emitting diode OLED may be red, green, blue, or white.

The protective layer PTL is disposed on the pixel layer PXL to cover the pixel layer PXL. The protective layer PTL electrically insulates the pixel layer PXL from the input detection member 120.

For example, the protective layer PTL may be an encapsulation layer encapsulating the pixel layer PXL. The protective layer PTL may include a plurality of laminated organic films and/or inorganic films.

The protective layer PTL may be a planarization layer for planarizing a top surface of the pixel layer PXL. The protective layer PTL may have various shapes and is not limited to any one embodiment.

The input detection member 120 is disposed on the protective layer PTL. The input detection member 120 may have an active area AR substantially overlapping an area at where the pixel layer PXL is disposed.

The input detection member 120 detects an external input provided to the active area AR of the display module 100.

The above-described external input may be provided in various manners. In FIGS. 1 and 2, an embodiment in which the external input inputted by a portion of a user's body (e.g., a finger) is detected are illustrated. The embodiments are exemplarily illustrated, and the external input provided to the input detection member 120 is not limited to any one manner. According to another embodiment of the inventive concept, the external input may be inputted through an optical, contacting, or magnetic manner.

The input detection member 120 may include an input detection cell including a plurality of input detection sensors for detecting the external input, driving wirings for applying an electric signal to the input detection cell or for transmitting the electric signal generated by the input detection cell to the outside, and pads. The pads may be connected to the display member 110 or to an external power supply device.

The input detection member 120 may detect the external input through various methods. For example, the input detection member 120 may be driven as a capacitive type, a resistive film type, or a coordinate recognition type.

As illustrated in FIG. 2, when the display apparatus 1000 is out-folded with respect to the folding axis FX such that the active area AR is exposed to the outside, the display apparatus 1000 may detect the external input even in the folded state.

Figure 7:
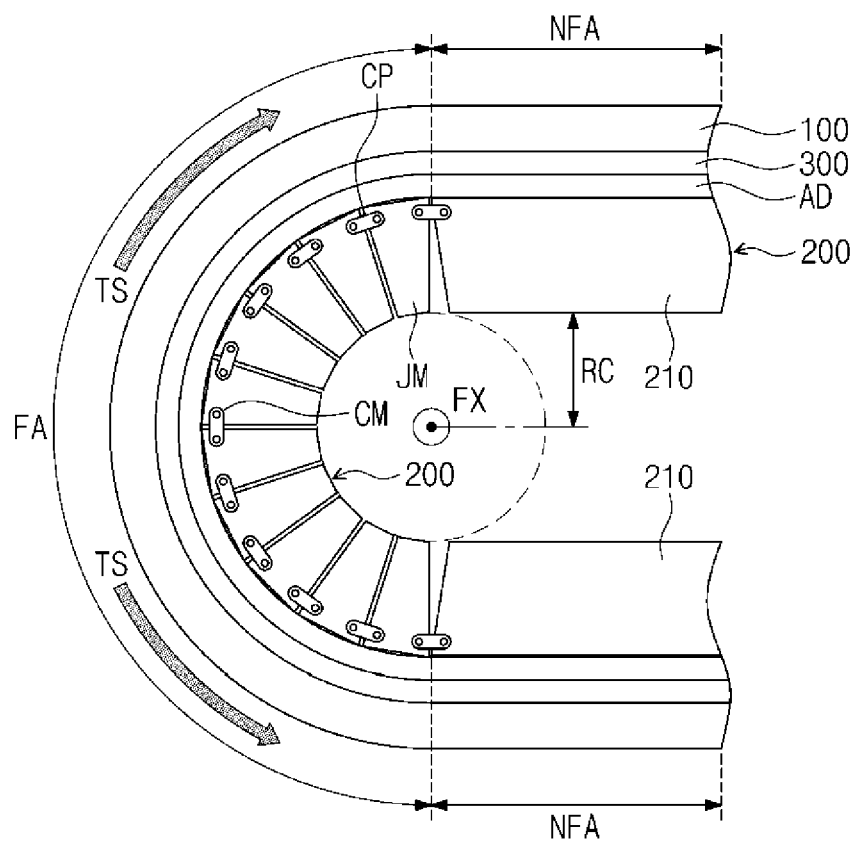
FIG. 7 is a view illustrating a folding area of the display apparatus in the outwardly folded state.
Figure 8A:
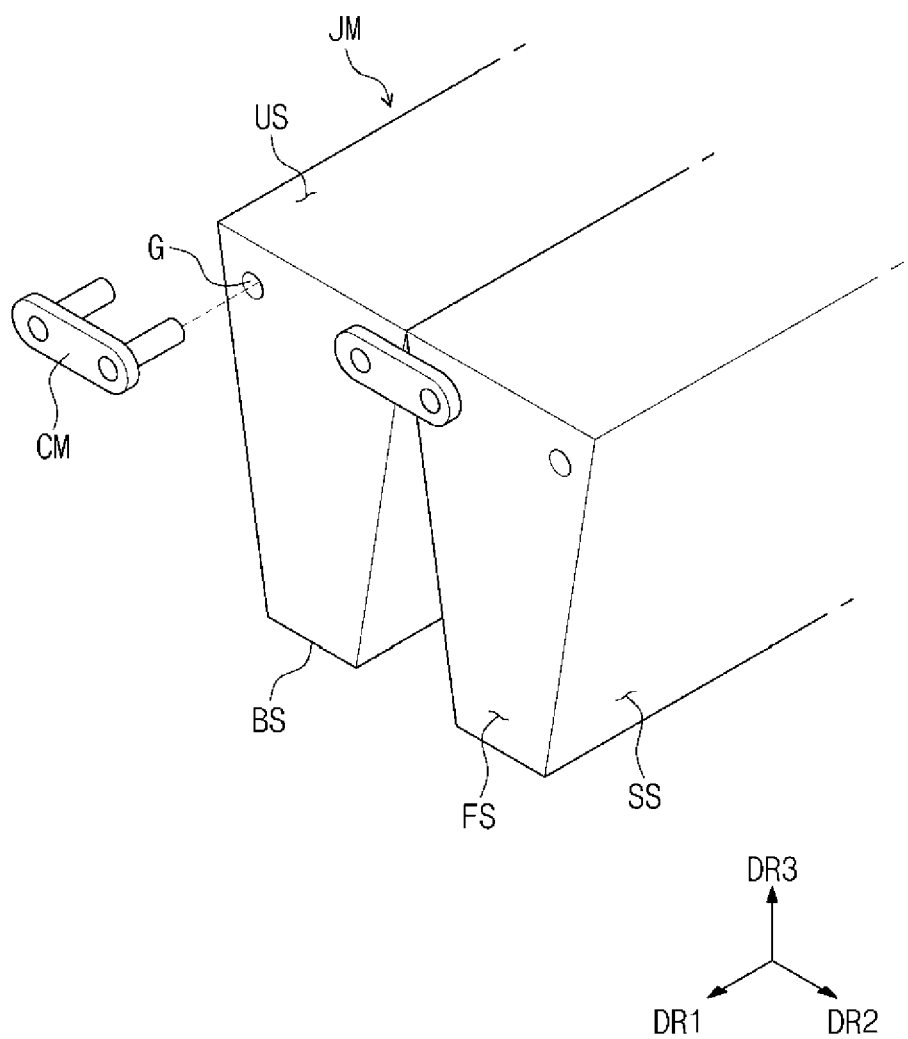
FIGS. 8A-8C are enlarged views of a folding part according to an embodiment of the inventive concept.
Figure 8B:
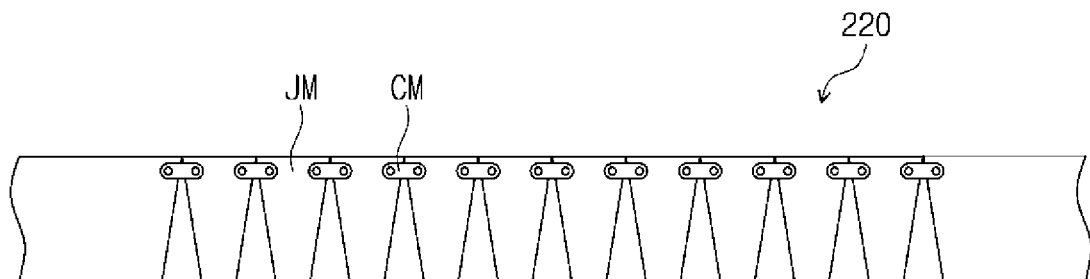
Figure 8C:
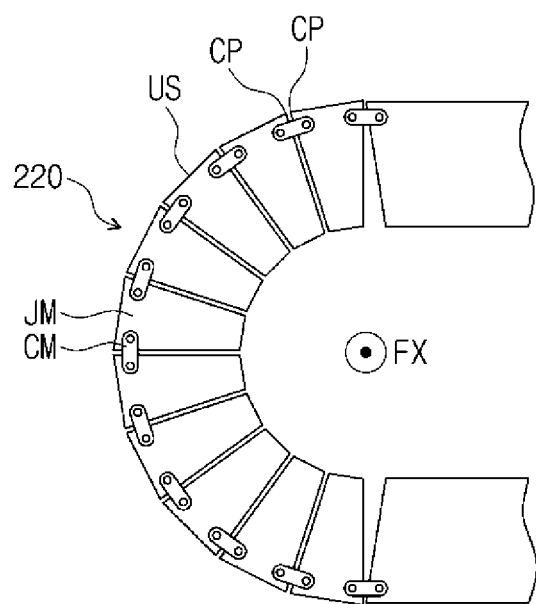

FIG. 7 is a view illustrating a folding area of the display apparatus in the outwardly folded state. FIG. 8A is a perspective view of the joint portions, and FIGS. 8B and 8C are enlarged views of the folding part.

Referring to FIGS. 7 and 8A-8C, each of the joint portions JM of the folding part 220 has a bar shape extending in the first direction DR1. Also, each of the joint portions JM may have a reverse trapezoidal cross-sectional shape.

For example, each of the joint portions JM includes a support surface US, a bottom surface BS, and a plurality of side surfaces SS and FS. The support surface US is a surface supporting the display module 100. The support surface US has a flat plate shape. The bottom surface BS is opposite to the support surface US. In the illustrated embodiment, the support surface US has a surface area greater than that of the bottom surface BS.

The side surfaces SS and FS extend between (connect) the support surface US to the bottom surface BS. In the illustrated embodiment, when the display apparatus 1000 is folded, a distance between the adjacent side surfaces SS of the joint portions JM from among the side surfaces SS and FS of the joint portions JM may decrease.

According to an embodiment of the inventive concept, the folding part 220 may further include a plurality of connection members CM.

For example, each of the connection members CM may have a bar shape. Each of the connection members CM may include a plurality of screws. The screws are disposed on opposite sides of each of the connection members CM. The screws may extend in the first direction DR1.

Also, each of the joint portions JM may include grooves G (e.g., openings or blind openings). Each of the grooves G is recessed inward from each of both side surfaces FS of each of the joint portions JM in the first direction DR1. The grooves G are defined more adjacent to (nearer to) the support surface US than to the bottom surface BS on the side surfaces FS of each of the joint portions JM.

The connection member CM connects two adjacent ones of the joint portions JM to each other. For example, one of the screws of the connection member CM is inserted into the groove G of one of the joint portions JM, and the other of the screws of the connection member CM is inserted into the groove G of another one of the joint portions JM disposed adjacent to the one of the joint portions JM.

The connection member CM may rotate with respect to each of the screws. Accordingly, when the display apparatus 1000 is folded with respect to the folding axis FX, the joint portions JM connected to the connection member CM rotate (e.g., rotate in a reference direction) and the folding part 220 may be folded.

Although in the illustrated embodiment two grooves G are defined in each of the side surfaces FS of each of the joint portions JM, embodiments of the inventive concept are not limited to a particular number of the grooves G in the joint portions JM. For example, according to another embodiment of the inventive concept, three or more grooves G may be defined in each of the side surfaces FS of each of the joint portions JM in the first direction DR1.

Also, although each of the joint portions JM is illustrated as including the grooves G, and the connection member CM includes the screws, embodiments of the inventive concept are not limited thereto. According to another embodiment of the inventive concept, protruding portions may be provided on each of the side surfaces FS of each of the joint portions JM in the first direction DR1 and the connection member CM may include openings (e.g., holes). In this embodiment, the joint portions JM may be connected to each other by the connection member CM by inserting the protruding portions into the openings in the connection member CM.

According to another embodiment of the inventive concept, the folding part 220 may not include the connection members CM. In this embodiment, an elastic member may be disposed between the joint portions JM. The elastic member may connect the joint portions JM to each other. Although a distance between the joint portions JM varies, the folding part 220 may be easily folded about the elastic member.

According to the illustrated embodiment, when the display apparatus 1000 is out-folded with respect to the folding axis FS to have a curvature RC, the support surfaces US of the joint portions JM may not form a continuous, smooth shape or surface. For example, when the display apparatus 1000 is folded, the support surfaces US that are adjacent to each other may have slopes that are different from each other. Accordingly, on a cross-section parallel to the folding axis FS, a cusp point CP or change in slope may be formed between the adjacent support surfaces US. The cusp point CP is a sharp point at which surfaces having different slopes meet each other on the cross-section.

In the illustrated embodiment, two cusp points CP are formed between each of the support surfaces US. However, when adjacent ones of the support surfaces US contact each other, only one cusp point CP may be formed between the adjacent support surfaces US.

Also, when the display apparatus 1000 is out-folded, a folding stress TS may be applied to the folding area FA as a tensile stress. Due to the folding stress, pressure may be applied in a direction from the folding part 220 to the display module 100.

When the protective member 300 is not provided between the display module 100 and the support member 200 (e.g., when the protective member 300 is omitted), a pressing phenomenon (e.g., pressure) may be generated on the display module 100 by the joint portions JM of the folding part 220 disposed on the folding area FA. For example, the pressure may concentrate in the display module 100 at the cusp points CP formed between the support surfaces US of the joint portions JM, causing stripe shaped damage to the display module 100. As a difference between slopes of the adjacent support surfaces US increases, a magnitude of the pressure concentrated on the cusp points CP increases. However, according to an embodiment of the inventive concept, when the protective member 300 is disposed between the display module 100 and the support member 200, the pressure is uniformly or substantially uniformly distributed. Accordingly, although pressure is applied to the display module 100 by the folding part 220, the display module 100 may not be damaged.

As a result, the display apparatus 1000 according to an embodiment of the inventive concept may have improved durability.

FIGS. 9A-11C are views illustrating folding parts according to other embodiments of the inventive concept. In describing FIGS. 9A-11C, descriptions of components that are the same or substantially similar to those described with respect to previously-described embodiments, for example, components having the same reference indicators as those described in connection with previously-described embodiments, may be omitted.

Figure 9A:
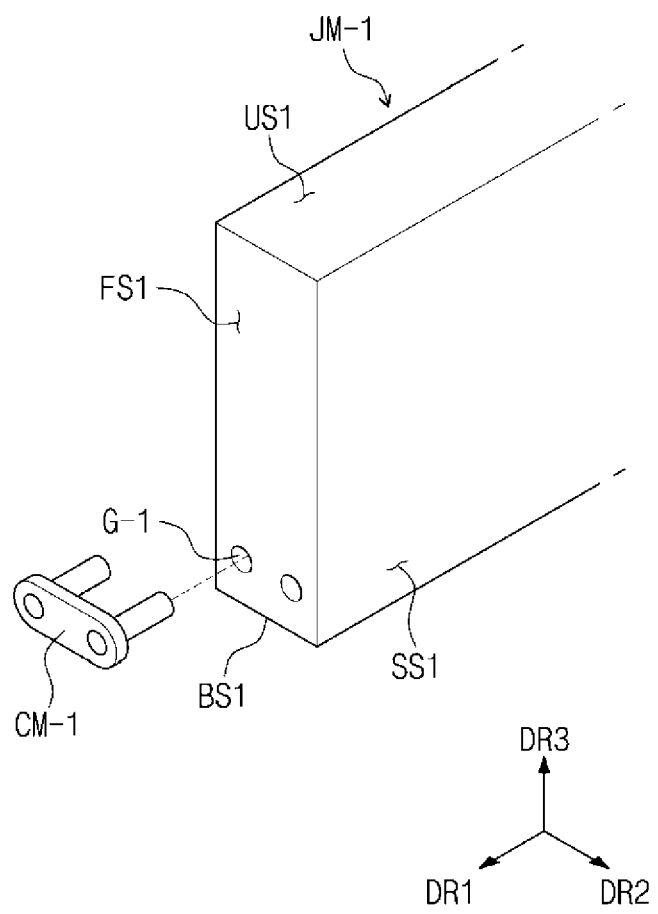
FIGS. 9A-9C are enlarged views of a folding part according to another embodiment of the inventive concept.
Figure 9B:
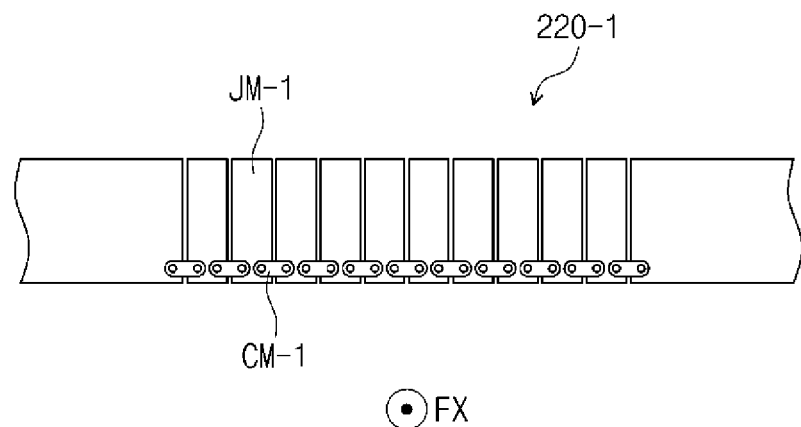
Figure 9C:
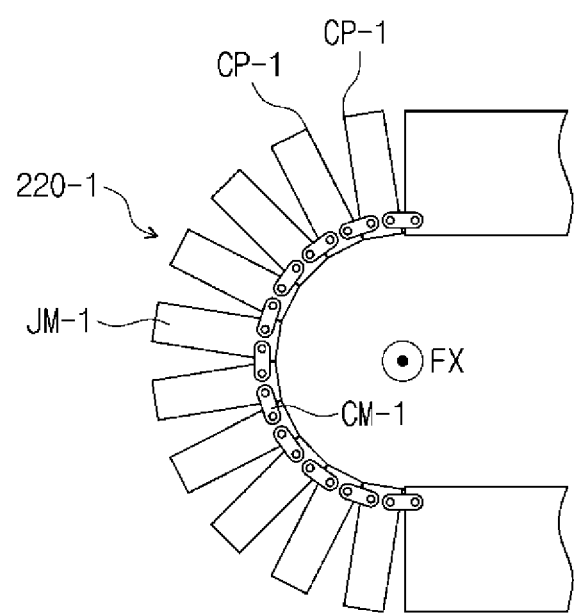

As illustrated in FIGS. 9A-9C, each joint portion JM-1 according to another embodiment of the inventive concept may have a rectangular cross-sectional shape. For example, a bottom surface BS1 may have a surface area equal to or substantially equal to that of a support surface US1.

In this embodiment, grooves G-1 are defined to be more adjacent to the bottom surface BS1 than to the support surface US1 on each side surface FS1 of the joint portions JM-1. In this embodiment, when a folding part 220-1 is folded, a distance between the side surfaces SS1 of the joint portions JM-1 may increase.

Figure 10A:
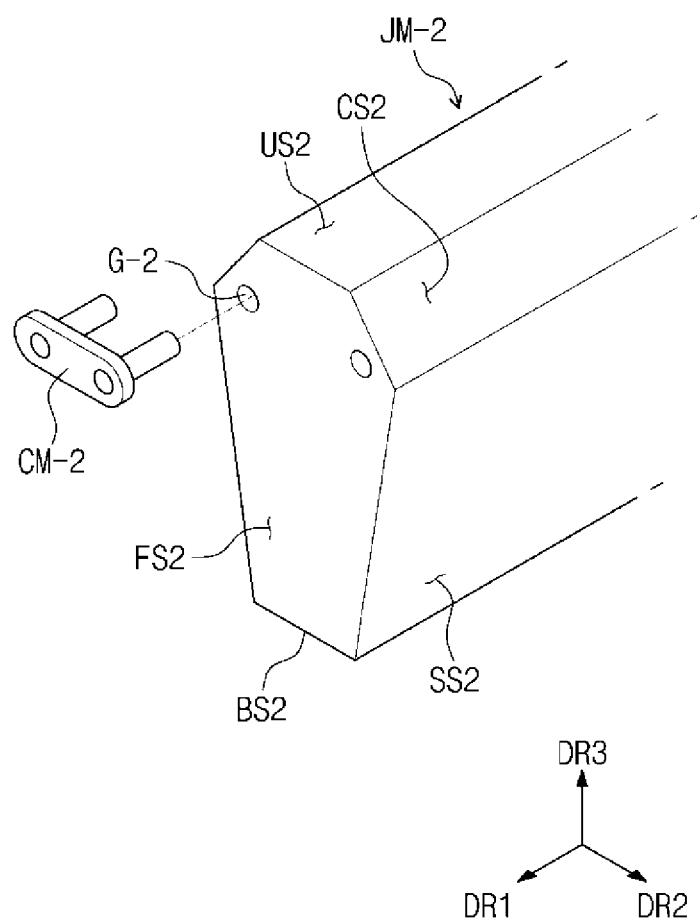
FIGS. 10A-10C are enlarged views of a folding part according to another embodiment of the inventive concept.
Figure 10B:
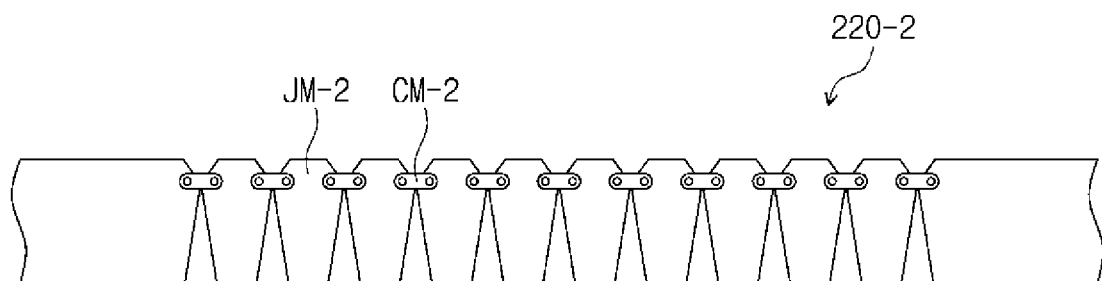
Figure 10C:
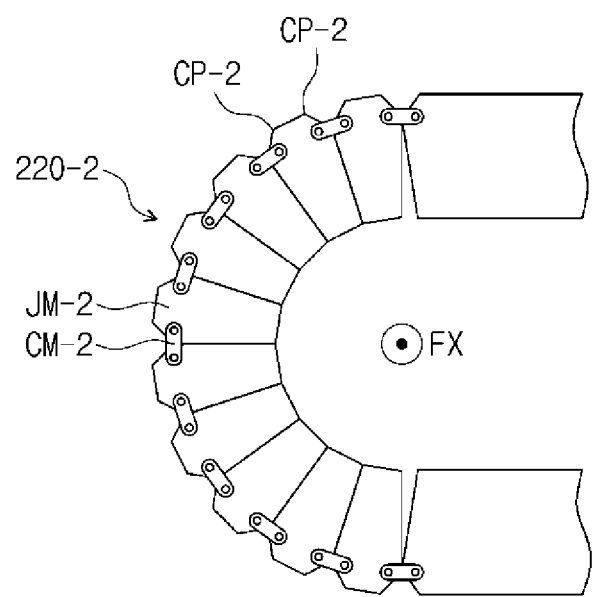

As illustrated in FIGS. 10A-10C, each joint portion JM-2 according to another embodiment of the inventive concept has a cross-sectional shape in which corners between a support surface US2 and each side surface SS2 extending between the support surface US2 and a bottom surface BS2 are chamfered.

For example, each of the joint portions JM-2 further includes chamfered surfaces CS2. The chamfered surfaces CS2 connect (or extend between) the side surfaces SS2 to the support surface US2.

A difference between slopes of the chamfered surface CS2 and the support surface US2 may be less than that between slopes of the side surfaces SS2 and the support surface US2.

According to the illustrated embodiment, because the corners of the support surfaces US2 of the joint portions JM-2 are chamfered, when a difference between the slope of the support surface US2 and the support surface US2 adjacent thereto decreases, a phenomenon in which a pressure is concentrated at both edges of each of the support surfaces US2 may be relieved.

Figure 11A:
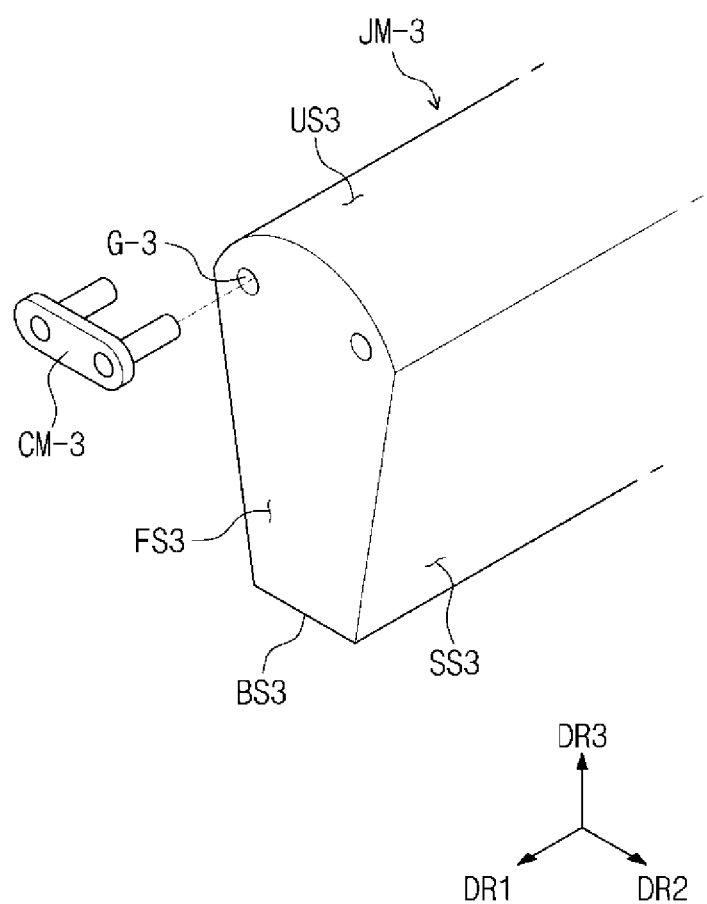
FIGS. 11A-11C are enlarged views of a folding part according to another embodiment of the inventive concept.
Figure 11B:
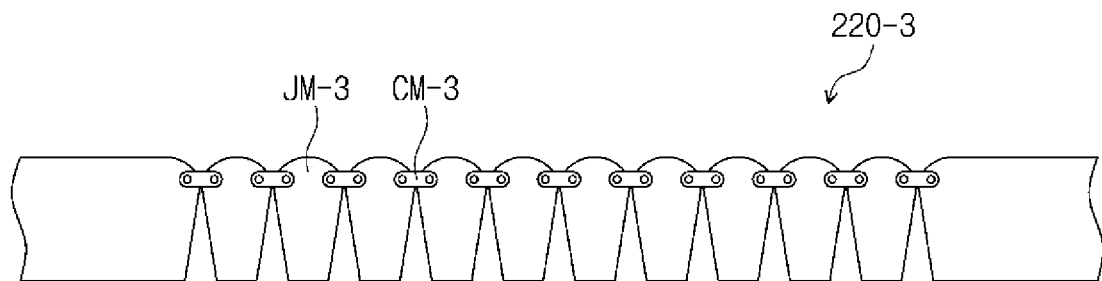
Figure 11C:
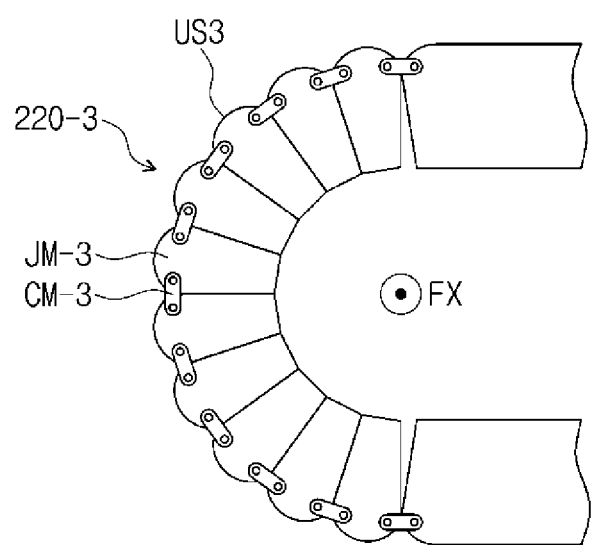

As illustrated in FIGS. 11A-11C, each support surface US3 of each joint portion JM-3 according to another embodiment of the inventive concept may have a curved shape. For example, the support surface US3 has an upwardly protruding shape. In this embodiment, although a cusp point is formed between adjacent support surfaces US3, pressure may not be concentrated at the cusp point. For example, because the pressure is applied at the protruding portion of the support surface US3, the pressure applied between the support surfaces US3 may decrease or may be reduced. Thus, according to this embodiment, a phenomenon in which the display module 100 is damaged by the support member 200 may be more effectively reduced or prevented.

In addition, embodiments of the inventive concept are not limited to each of the joint portions having the same shape. For example, each of the joint portions may have various suitable shapes.

FIG. 12 is a cross-sectional view of a display device according to another embodiment of the inventive concept. In describing FIG. 12, descriptions of components that are the same or substantially similar to those described with respect to previously-described embodiments, for example, components having the same reference indicators as those described in connection with previously-described embodiments, may be omitted.

Referring to FIG. 12, a protective member 300-4 according to another embodiment of the inventive concept includes a first portion 310 and one or more second portions 320.

The first portion 310 overlaps the folding area FA. The second portions 320 overlap the non-folding area NFA. In this embodiment, a number of second portions 320 are provided to correspond to a number of the non-folding areas NFA. In the illustrated embodiment, two second portions 320 respectively correspond to two non-folding areas NFA. Opposite edges of the first portion 310 are connected to the second portions 320 so that the first portion 310 and the second portions 320 are integrated with each other.

The first portion 310 is disposed between the display module 100 and the folding part 220, and each of the second portions 320 is disposed between the display module 100 and the support plate 210.

According to an embodiment, the first portion 310 may be made of a material that is different from that of the second portion 320. For example, the first portion 310 may have strength that is less than that of the second portion 320. Also, the first portion 310 may have a thermal expansion rate greater than that of the second portion 320. Thus, the folding part 220 may be easily folded. For example, a display apparatus 1000-4 including the protective member 300-4 may have improved folding characteristics.

Figure 13:
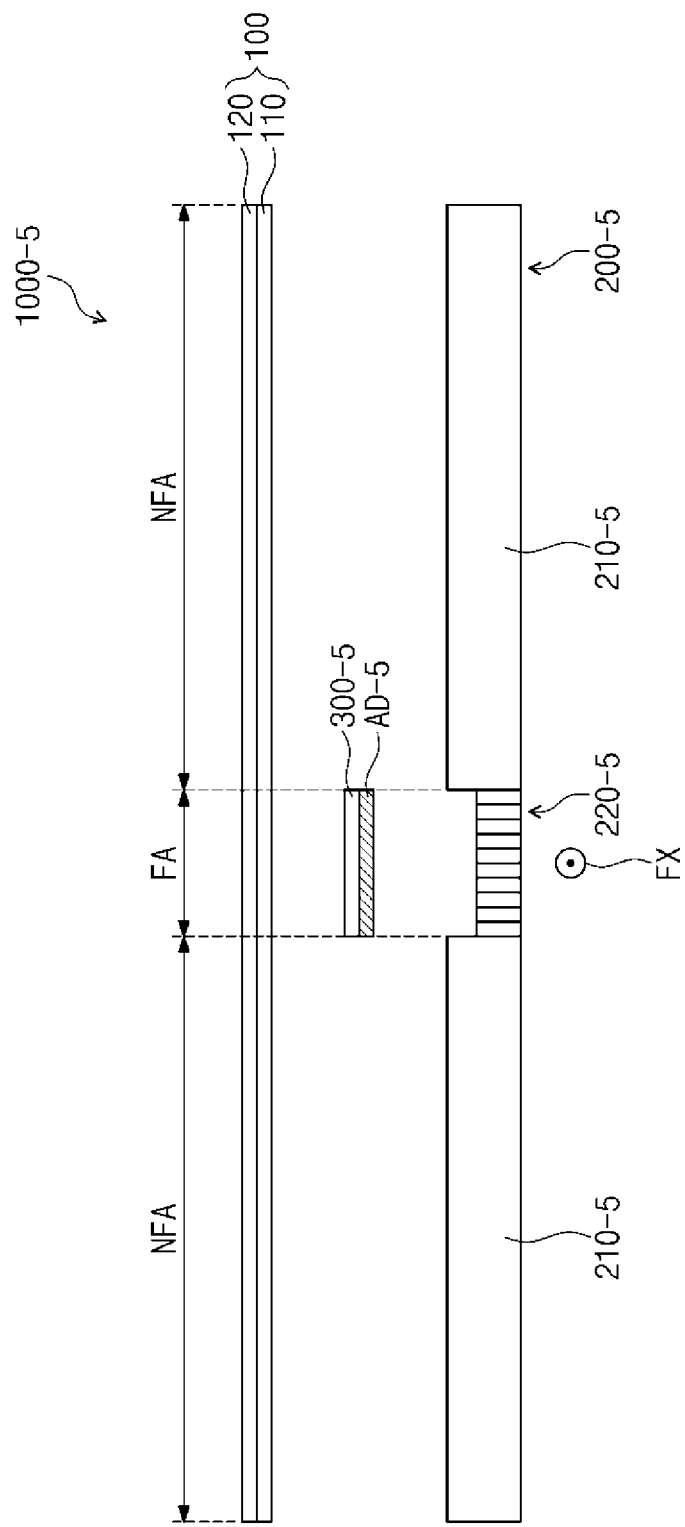
FIGS. 13 and 14 are cross-sectional views of a display apparatus according to another embodiment of the inventive concept.

FIG. 13 is a cross-sectional view of a display device according to another embodiment of the inventive concept.

In describing FIG. 13, descriptions of components that are the same or substantially similar to those described with respect to previously-described embodiments, for example, components having the same reference indicators as those described in connection with previously-described embodiments, may be omitted.

Figure 14:
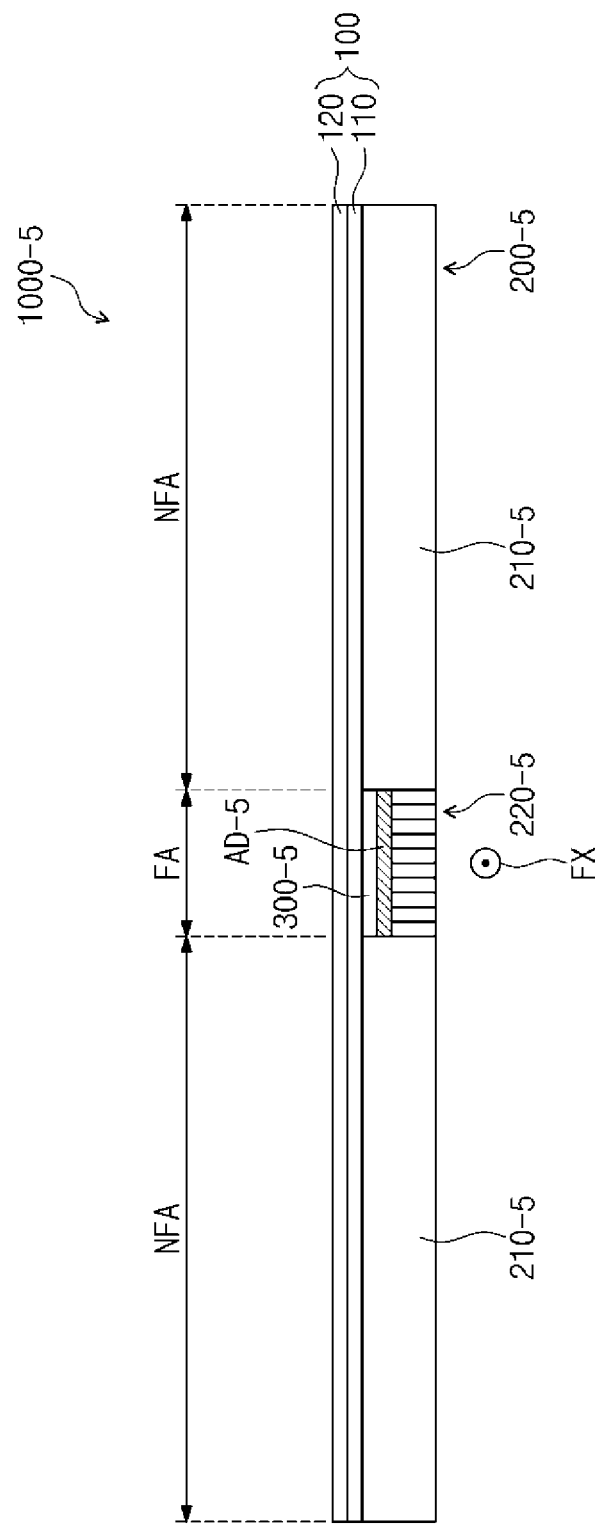

Referring to FIGS. 13 and 14, each support plate 210-5 according to another embodiment of the inventive concept may have a thickness greater than that of a folding part 220-5. Accordingly, on a cross-section, a step (e.g., a stepped portion) may be formed between upper surfaces of the support plates 210-5 and the folding part 220-5.

A protective member 300-5 is disposed between the folding part 220-5 and the display module 100. On a plane, the protective member 300-5 may have a surface area equal to or substantially equal to that of the folding area FA. Accordingly, the protective member 300-5 may be disposed between the support plates 210-5 on the plane.

A display apparatus 1000-5 according to this embodiment may further include an adhesion member AD-5. The adhesion member AD-5 is disposed between the protective member 300-5 and the folding part 220-5. On the plane, the adhesion member AD-5 has a surface area equal to or substantially equal to that of the protective member 300-5.

A sum of thicknesses (e.g., an overall thickness) of the protective member 300-5 and the folding part 220-5 is equal to or substantially equal to a thickness of the support plates 210-5 (e.g., the protective member 300-5 fills the step formed between the upper surfaces of the support plates 210-5 and the folding part 220-5). Accordingly, the upper surface of each of the support plates 210-5 may contact a bottom surface of the display module 100 on the non-folding area NFA.

According to this embodiment of the inventive concept, the display apparatus 1000-5 has improved durability. Because the protective member 300-5 is disposed between the display module 100 and the support member 200-5, the phenomenon in which the display member is damaged due to the folding stress applied between the support member and the display member may be prevented or reduced. Thus, the durability of the display apparatus 1000-5 may be improved.

Although exemplary embodiments of the present invention have been described, it is understood that the present invention should not be limited to these exemplary embodiments but various changes and modifications can be made by one having ordinary skilled in the art within the spirit and scope of the present invention. The scope of the present invention is to be determined by the broadest permissible interpretation of the following claims and their equivalents and shall not be restricted or limited by the foregoing detailed description.

What is claimed is:

1. A display apparatus comprising:
    a display module has a folding area and a non-folding area adjacent to the folding area;
    a support member below the display module, the support member comprising:
        a plurality of joint portions, each of the plurality of joint portions having a support surface supporting the display module, a bottom surface opposite the support surface, and a plurality of side surfaces extending between the support surface and the bottom surface; and
        a plurality of connection members respectively connecting adjacent ones of the joint portions to each other; and
    a protective member between the display module and the support member,
    wherein the protective member has a first portion overlapping the folding area and a second portion overlapping the non-folding area,
    wherein the first portion comprises a material different from that of the second portion,
    wherein each of the joint portions comprises a plurality of grooves on each of the side surfaces, the plurality of grooves being adjacent to the support surface, and
    wherein each of the plurality of connection members extends into one of the grooves in each of two adjacent ones of the joint portions.

2. The display apparatus of claim 1, wherein the support member has a folding part overlapping the folding area and comprises a support plate connected to the folding part and overlapping the non-folding area,
    wherein the display module is configured to be folded about a folding axis at the folding area,
    wherein the joint portions are at the folding part of the support member, extend parallel to the folding axis, and are connected to each other, and.

3. The display apparatus of claim 2, wherein the joint portions connected to the connection members are rotated by the connection member to allow the folding part to be folded.

4. The display apparatus of claim 2, wherein, when the support member is folded, a cusp point is formed between adjacent ones of the support surfaces on a cross-section.

5. The display apparatus of claim 2, wherein the first portion has a strength that is less than that of the second portion.

6. The display apparatus of claim 2, wherein the support member has a thickness greater than that of the folding part.

7. The display apparatus of claim 2, wherein the bottom surface is nearer to the folding axis than the support surface.

8. The display apparatus of claim 7, wherein the support surface has a surface area greater than that of the bottom surface.

9. The display apparatus of claim 8, wherein each of the joint portions has a reverse trapezoidal cross-sectional shape.

10. The display apparatus of claim 7,
wherein corners between the support surface and the side surfaces have a chamfered shape.

11. The display apparatus of claim 7, wherein each of the joint portions has a rectangular cross-sectional shape.

12. The display apparatus of claim 7, wherein the support surface comprises a curved surface.

13. The display apparatus of claim 1, further comprising an adhesion member between the support member and the protective member to couple the support member to the protective member.

14. The display apparatus of claim 1, wherein the protective member has a strength greater than that of the display module and equal to or less than that of the support member.

15. The display apparatus of claim 1, the first portion has a thermal expansion rate greater than that of the second portion.

16. The display apparatus of claim 1, wherein the protective member has a surface area equal to that of the folding area.

17. The display apparatus of claim 1, wherein the display module comprises:
a display member configured to display an image; and
an input detection member on the display member and configured to detect an external input, the input detection member comprising a plurality of input detection sensors.

* * * * *